Figure 1:
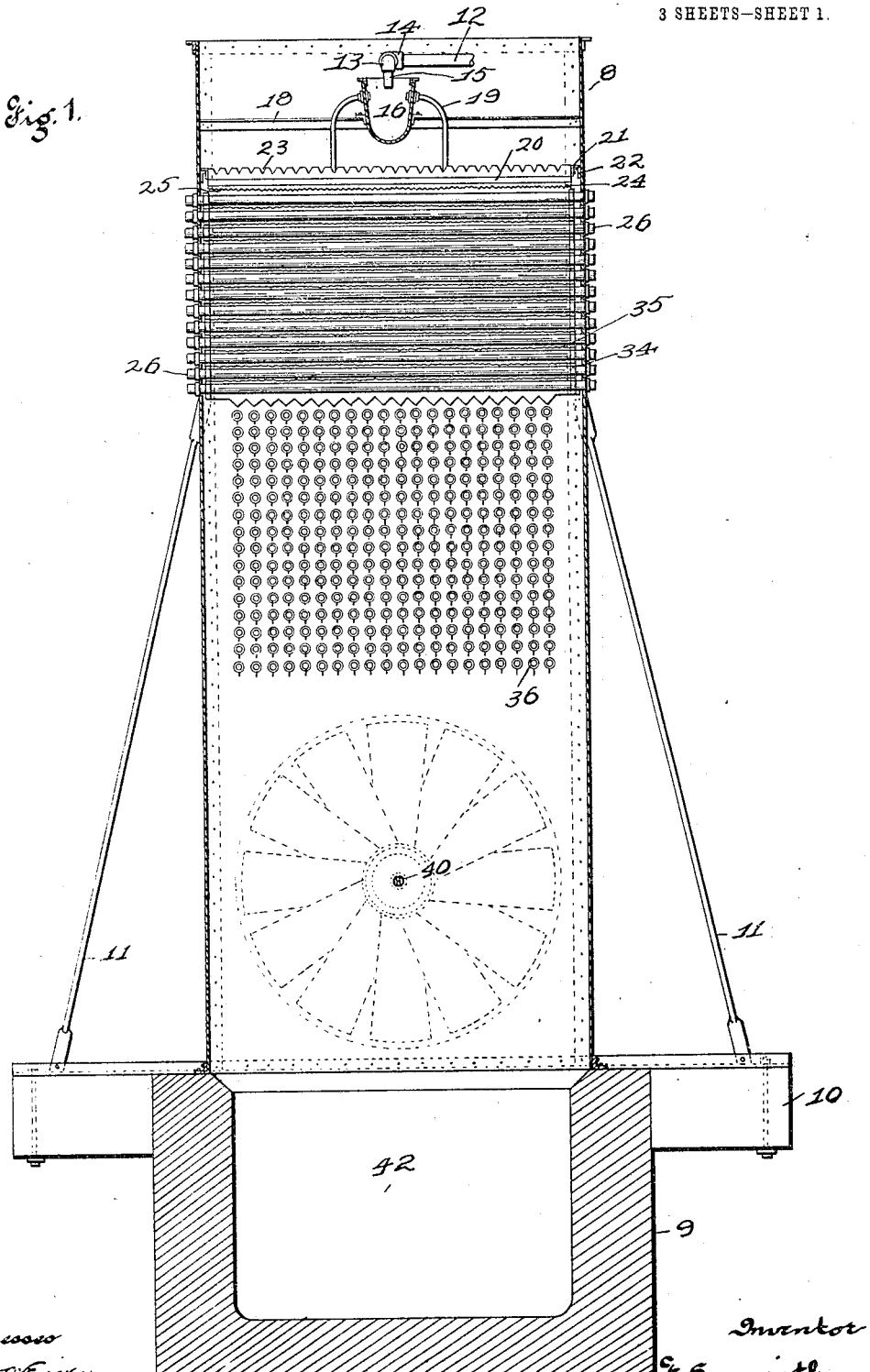

No. 808,050. PATENTED DEC. 19, 1905.
F. HAUSWIRTH.
WATER COOLING TOWER.
APPLICATION FILED SEPT. 5, 1903.

3 SHEETS—SHEET 1.

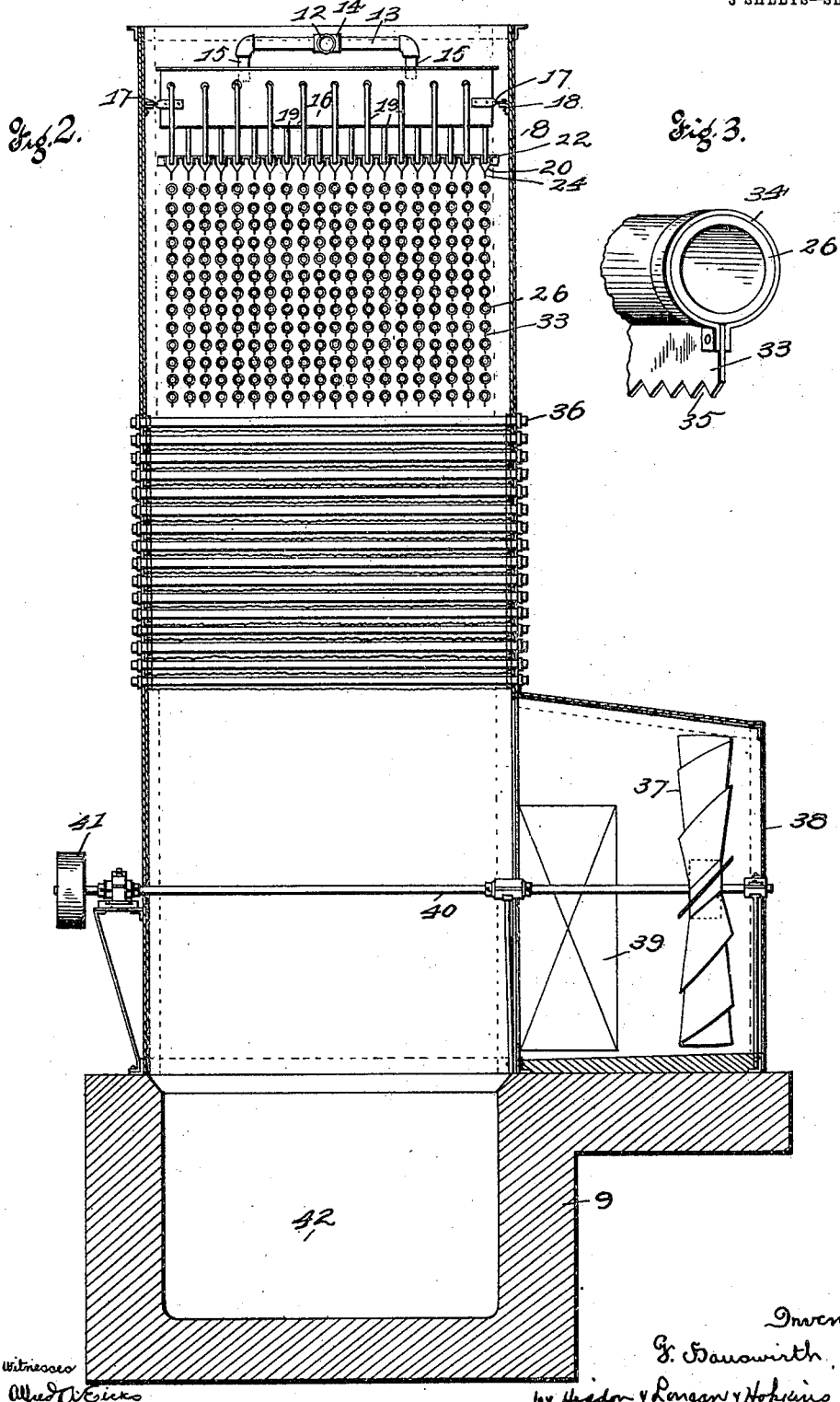

No. 808,050. PATENTED DEC. 19, 1905.
F. HAUSWIRTH.
WATER COOLING TOWER.
APPLICATION FILED SEPT. 5, 1903.
3 SHEETS—SHEET 3.
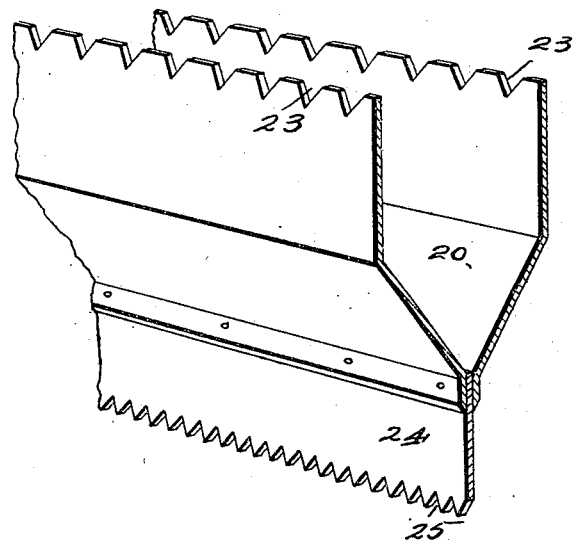
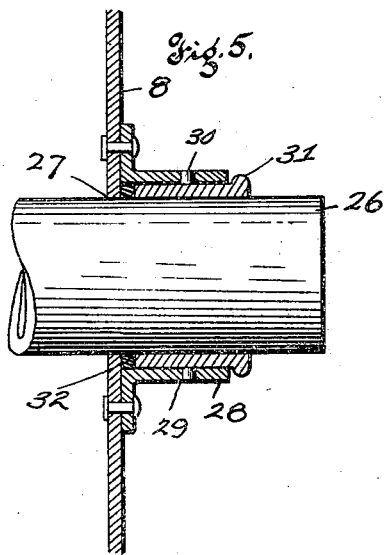 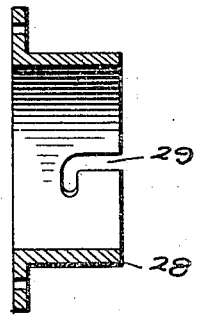 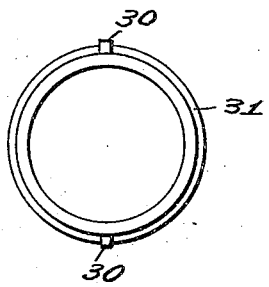

UNITED STATES PATENT OFFICE.

FREDERICK HAUSWIRTH, OF ST. LOUIS, MISSOURI.

WATER-COOLING TOWER.

No. 808,050.  Specification of Letters Patent.  Patented Dec. 19, 1905.

Application filed September 5, 1903. Serial No. 172,183.

*To all whom it may concern:*

Be it known that I, FREDERICK HAUSWIRTH, a citizen of the United States, residing at St. Louis, State of Missouri, have invented certain new and useful Improvements in Water-Cooling Towers, of which the following is a specification containing a full, clear, and exact description, reference being had to the accompanying drawings, forming a part hereof.

My invention relates to improvements in water-cooling towers, and has for its object to provide such towers with banks of cooling-pipes having direct openings to the outer atmosphere and to secure the equable distribution of the water over such pipes.

In the drawings, Figure 1 is a vertical view in mid-section of a water-cooling tower embodying my invention. Fig. 2 is a transverse vertical view in mid-section of the same. Fig. 3 is an enlarged perspective view showing the means by which the water-distributing blades are fastened to the cooling-pipes. Fig. 4 is an enlarged perspective view of one of the troughs from which the water is distributed to the cooling-pipes. Fig. 5 is a side view of the end of one of the cooling-pipes, showing the side of the tower and the attaching devices in section. Fig. 6 is a vertical view in mid-section of the socket, whereby the cooling-pipe is held in place at the side of the tower. Fig. 7 is a bottom view of the collar provided with trunnions, which is shown in mid-section in Fig. 5.

In the class of devices to which my invention relates a water-tower is provided into the upper end of which the water to be cooled is introduced, and the cooling process is effected by the introduction of one or more blasts of fresh air by means of fans.

The object of my present invention is to utilize the prevailing air-currents as a means of cooling the water, thus minimizing the use of the artificial air-currents for that purpose.

Incidentally my present invention provides for the uniform distribution of water over the cooling-pipes and the accurate and detachable fastening of the cooling-pipes within the tower, so that the said pipes when in place are held securely to the tower, leakage is prevented, and the pipes may be readily removed for purposes of replacement or repair.

In the drawings the outer shell of the tower is indicated by the numeral 8, the foundation by the numeral 9, the transverse foundation-timbers by the numeral 10, and the guys whereby the shell 8 is supported from the timbers 10 are indicated by the numeral 11.

Water is introduced to the tower by means of the inlet-pipe 12, to which the distributing-pipe 13 is connected by means of the T-joint 14, the distributing-pipe 13 being provided with a series of nozzles 15, which empty into the receptacle 16. The receptacle 16 extends transversely across the tower near its top and is provided at its ends with the lugs 17, which rest upon and are detachably fastened to brackets 18 on the side of the shell 8. The receptacle 16 is provided along its sides and near its top with the distributing-pipes 19, which extend downwardly into the troughs 20, the troughs 20 being provided at their outer ends with lugs 21, which rest upon and are detachably secured to brackets 22 on the inner side of the shell 8. The troughs 20 are provided with notches 23 along their upper edges and are provided at their bottoms with the blades 24, whose lower edges contain the notches 25.

Pipes 26 extend from the shell 8 in alinement with the blades 24, the pipes 26 being arranged in vertical and parallel columns, as shown in section in Fig. 2. The shell 8 is provided with an adequate number of openings 27 to receive the ends of the pipes 26. About the openings 27 the sockets 28 are mounted, being provided with curved notches 29 to receive the trunnions 30. The trunnions 30 are mounted upon collars 31, which are rigidly attached to the pipes 26 near their outer extremities. In locking the pipes 26 in place the washer 32 or other suitable packing material is inserted between the inner end of the collar 31 and the outer side of the shell 8 and within the socket 28 in order to form a water-tight joint. Each of the pipes 26 is provided with the depending blade 33, which is mounted upon the pipes 26 by means of the split ring 34, each of the blades 33 being provided with notches 35 along its lower edge. Beneath the pipes 26 the pipes 36 are arranged in vertical columns and transverse position, each of the pipes 36 being provided with the blade 33 and secured between the shell 8 in the same manner as the pipes 26.

In the drawings I have shown the fan 37 mounted in the fan-chamber 38, the fan-chamber 38 having a door 39 and the fan 37 being mounted upon the shaft 40 and driven by the pulley 41, such fan mechanism being commonly used in this connection in the art.

The mode of operation of the hereinbeforedescribed devices is as follows: The pipes 26 and 36 are preferably arranged in north and south and east and west alinement, respectively, in order that one of the said banks of pipes will always receive the natural current of air then prevailing. In other words, there will always be an atmospheric draft through the pipes, because the pipes are open at both ends beyond the walls of the tower. These banks of pipes may be greater in number and may be disposed to each other at angles less than right angles in order to accommodate them to all of the air-currents which may prevail. By this means a current of fresh air is naturally provided at all times through the tower. The pipes 26 and 36 are disposed horizontally, and the herein-described means for the distribution of water over and around said pipes operates as follows: The water to be cooled is introduced through the pipe 12, the distributing-pipe 13, and nozzles 15 to the receptacle 16 and pipes to the troughs 20. These troughs 20 becoming filled the overflow is distributed through the notches 23 down the outside walls of the troughs 20 over the blades 24 to the pipes 26. The water thus distributed falls upon the center of the top of each of the pipes 26 around its outer side and is distributed downwardly over the blade 33. The distribution is further effected by the water traveling over the lower pipes 26 being received by the upper of the pipes 36 and traveling successively over the pipes 36 into the receiving-chamber 42.

By the arrangement of the cooling-pipes and the method of distribution of the water which I have described water may be cooled more quickly and economically than where an artificial air-current is wholly relied upon, and in situations where the natural air-currents are measurably regular in their movement the use of an artificial air-current may be dispensed with altogether.

Having fully described my invention, what I claim is—

1. The improved water-cooling tower, comprising the vertical shell or casing; a fan arranged to force air into the base of said casing; a bank of pipes having their ends removably fixed in opposite walls of said casing and extending horizontally, with their ends projecting freely into the atmosphere exterior of the said shell, whereby natural atmospheric drafts of air may circulate through said pipes; and means for distributing water upon said bank of pipes, substantially as described.

2. The improved water-cooling tower, comprising the vertical shell or casing; a fan arranged to force air into the base of said casing; a bank of pipes having their ends removably fixed in opposite walls of said casing, and extending horizontally, with their ends projecting freely into the atmosphere exterior of the said shell, whereby natural atmospheric drafts of air may circulate through said pipes; an additional bank of pipes constructed like the bank just mentioned, but having their ends projecting in a direction at right angles to those of the said first-mentioned bank of pipes, whereby the natural atmospheric draft may circulate through at least one of said banks of pipes, regardless of the direction in which the wind is moving, and means for distributing water upon said banks of pipes, substantially as described.

In testimony whereof I have signed my name to this specification in presence of two subscribing witnesses.

FREDERICK HAUSWIRTH.

Witnesses:
M. G. IRION,
JOHN C. HIGDON.